United States Patent
Önnerlöv

[19]
[11] Patent Number: 6,152,670
[45] Date of Patent: Nov. 28, 2000

[54] STORAGE ARRANGEMENT FOR CORES OF A PAPERMAKING MACHINE

[75] Inventor: Lars-Erik Önnerlöv, Karlstad, Sweden

[73] Assignee: Valmet-Karlstad AB, Karlstad, Sweden

[21] Appl. No.: 09/017,892

[22] Filed: Feb. 3, 1998

Related U.S. Application Data

[60] Provisional application No. 60/049,250, Jun. 10, 1997.

[30] Foreign Application Priority Data

Feb. 3, 1997 [SE] Sweden .................................. 9700386

[51] Int. Cl.⁷ ...................................................... B65G 1/04
[52] U.S. Cl. .......................... 414/276; 193/27; 242/561; 414/911
[58] Field of Search ..................................... 414/276, 911; 193/2 R, 38, 39, 40, 27, 28; 221/124, 197, 11; 220/1.5; 242/561, 560.1, 559

[56] References Cited

U.S. PATENT DOCUMENTS

| | | |
|---|---|---|
| 475,067 | 5/1892 | Risdon ................................. 193/27 X |
| 1,932,225 | 10/1933 | Minter ................................. 193/27 X |
| 3,141,537 | 7/1964 | Dillaha ..................................... 193/27 |
| 3,460,660 | 8/1969 | Edens et al. ............................. 193/27 |
| 3,727,854 | 4/1973 | Grotzbach . |
| 3,990,646 | 11/1976 | Salgo . |
| 4,716,646 | 1/1988 | Jarreby . |
| 5,447,407 | 9/1995 | Weaver et al. ........................ 193/27 X |

FOREIGN PATENT DOCUMENTS

| | | |
|---|---|---|
| 0 082 129 A1 | 6/1983 | European Pat. Off. . |
| 1590209 | 5/1970 | France ..................................... 193/27 |
| 196 384 | 5/1965 | Sweden . |
| 844507 | 7/1981 | U.S.S.R. . |

Primary Examiner—Frank E. Werner
Attorney, Agent, or Firm—Alston & Bird LLP

[57] ABSTRACT

A storage arrangement for empty cores for a reel-up in which paper is wound to form reels of paper, said storage arrangement having a stand comprising a feed-out ramp and a container with a top, a bottom and four vertical sides consisting of a front side facing the feed-out ramp, a rear side and two sides, said four sides between them defining a space for empty cores, which container also comprises an upper inlet opening and a lower outlet opening in conjunction with the upstream end of the feed-out ramp. According to the invention a plurality of downwardly inclined planes are arranged one beneath the other inside the container, directed alternately from the front side and the rear side, each plane having a downstream end located a predetermined distance from the adjacent rear side or front side to provide an opening therebetween so that each empty core rolling down an upstream plane continues freely to the next plane in a continuous path from the inlet opening to the outlet opening. The stand also includes a stand table, at which the container is exchangeably arranged in conjunction with the feed-out ramp to enable transport of the container to a filling station.

7 Claims, 8 Drawing Sheets

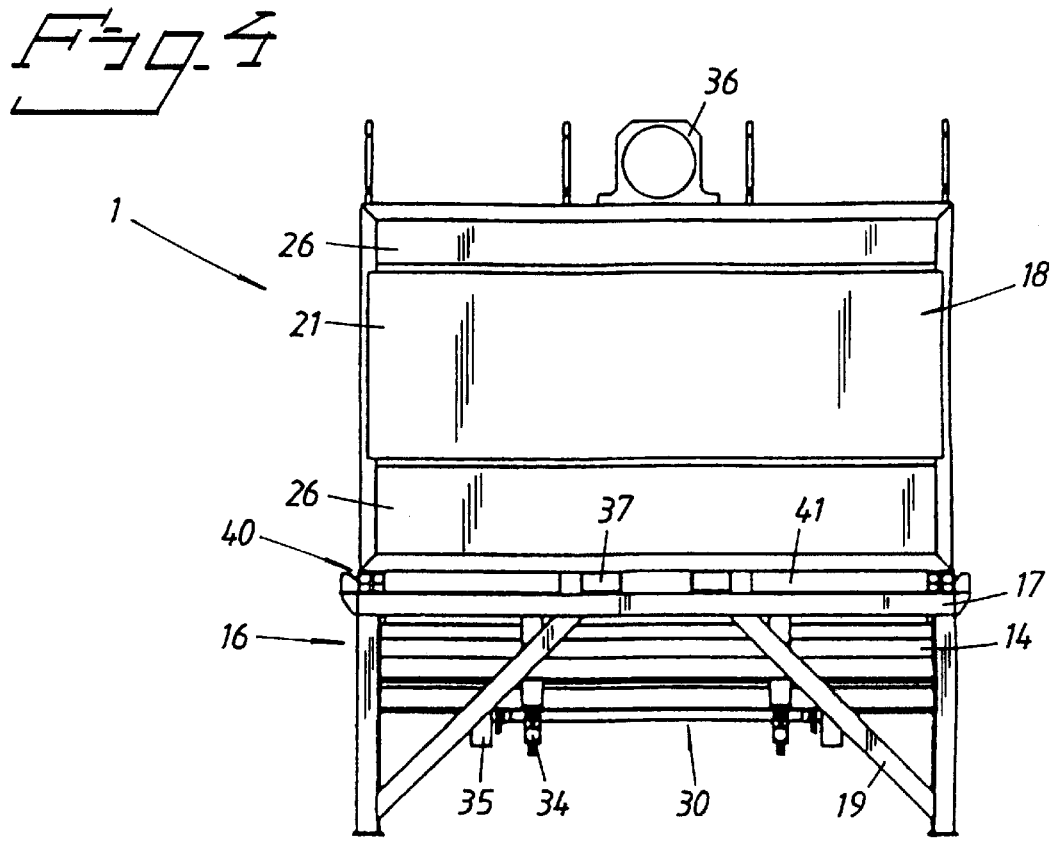
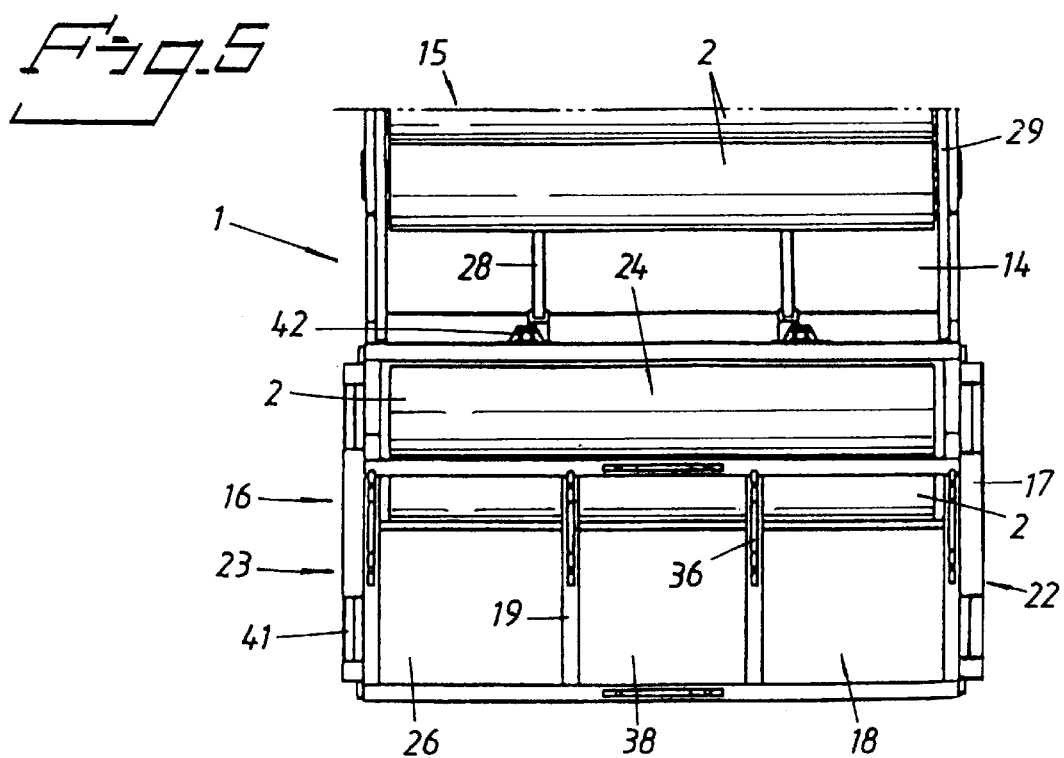

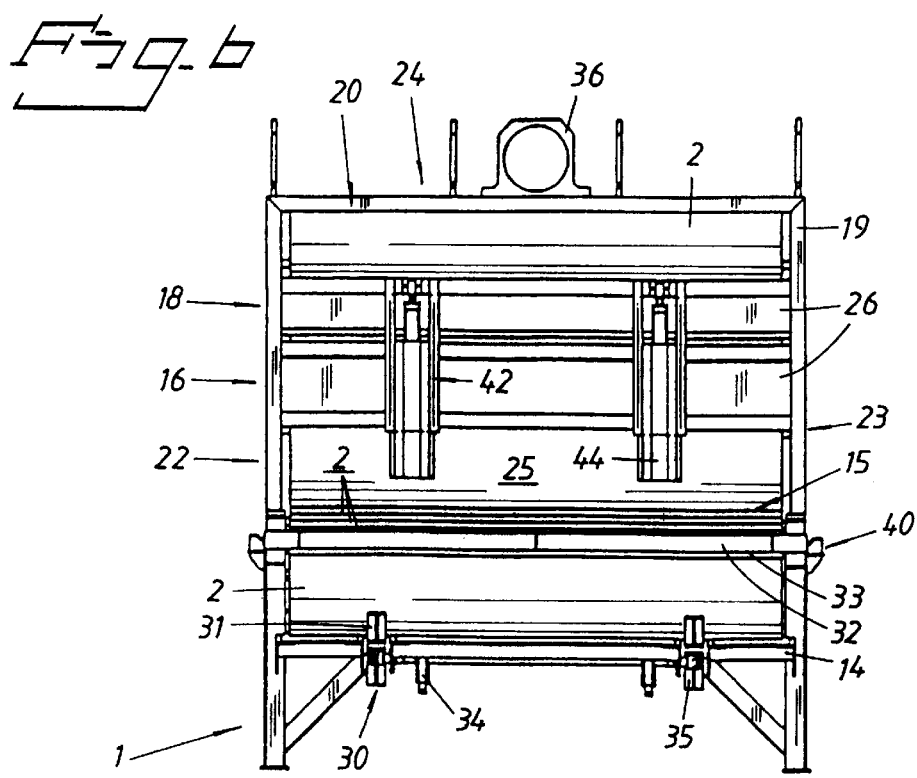
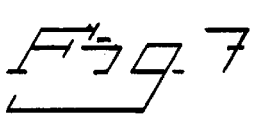  
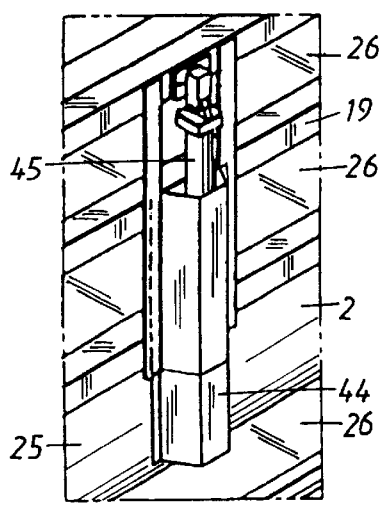 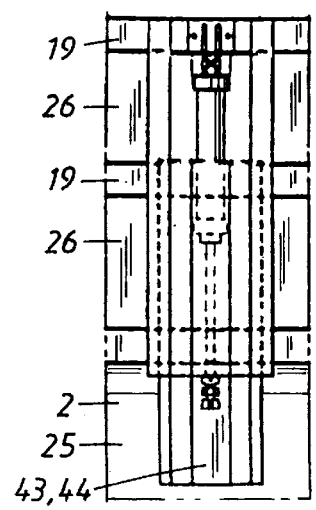 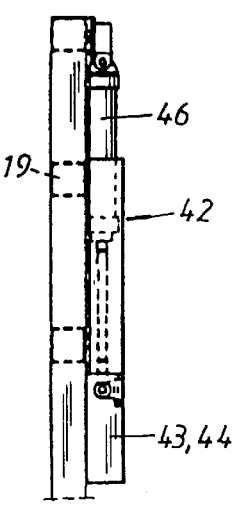

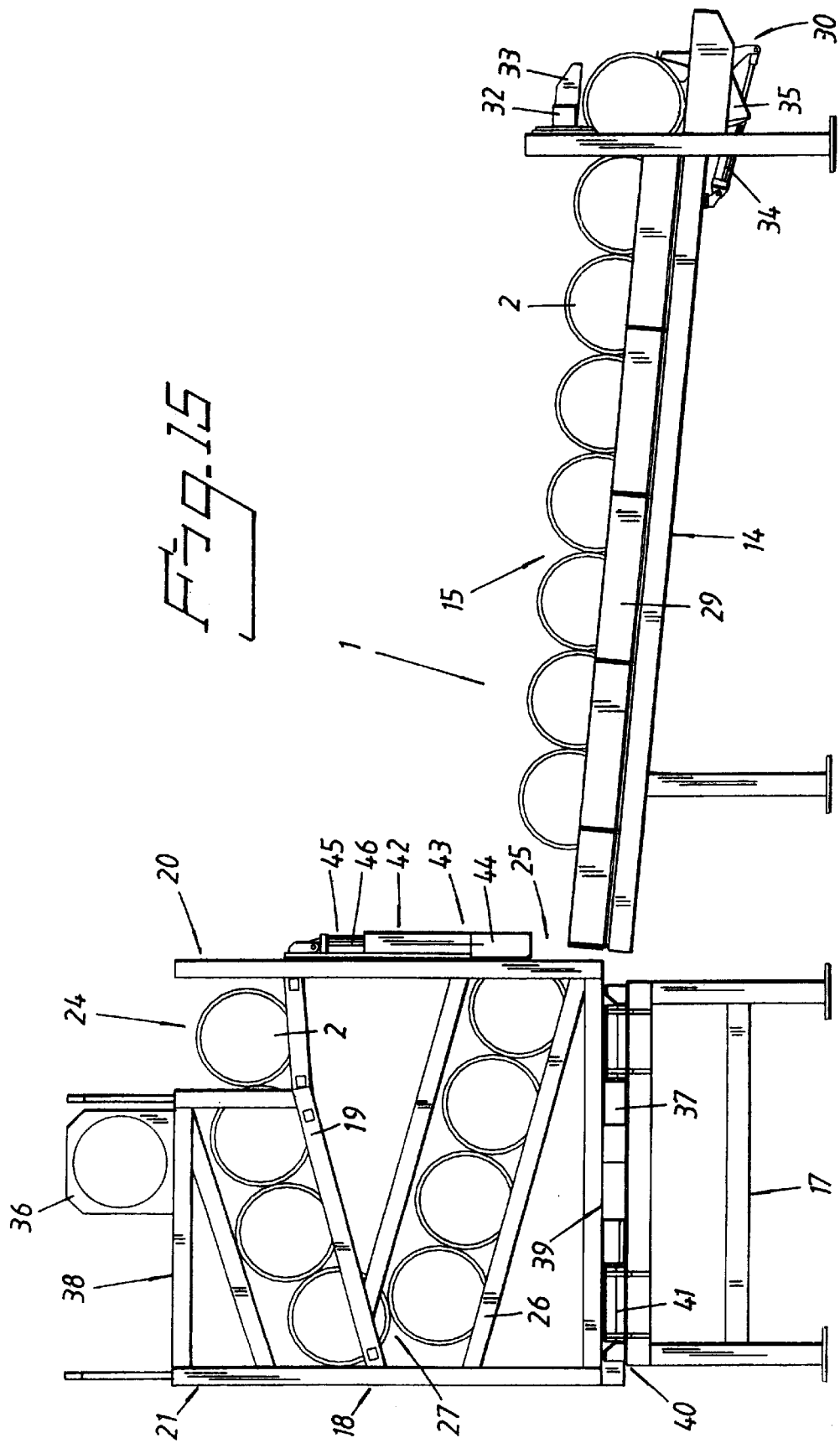

STORAGE ARRANGEMENT FOR CORES OF A PAPERMAKING MACHINE

CROSS-REFERENCE TO RELATED APPLICATIONS

This application claims the benefit of U.S. Provisional Application Ser. No. 60/049,250 filed Jun. 10, 1997.

FIELD OF THE INVENTION

The present invention relates to papermaking machines, and more particularly relates to devices for storing and distributing cores to a papermaking machine where reels of paper are wound on the cores.

BACKGROUND OF THE INVENTION

One of two different methods are generally used in a reel-up for winding a continuous web manufactured in a paper machine to a finished reel of paper, depending on the type of reeling drum used in the reel-up. The first method uses an empty reeling drum, also termed a core shaft, for production of coreless paper reels, while in the second alternative a hollow core is applied on said reeling drum in the form of a non-deformable cylindrical sleeve, preferably of cardboard. In this latter case the core usually consists of a tube built up of a multi-layered wall of wound paper which has been laminated with a suitable binder such as water glass. For this category of empty core, intended for paper reels, the diameter may generally reach approximately 40–50 cm.

At the start of reeling, the paper web is secured to the core, usually with the aid of a strip of adhesive or tape. In order to achieve continuous production of paper reels, new reeling drums are constantly supplied with empty cores from some type of store, also known as the core shaft stock. This stock is preferably arranged close to the surface winding drum at the upstream end of the reel-up, and suitably at a level just above the production line of the reel-up in order to save space. The stock must then be continuously replenished as the reeling drums with the cores are used up by the reel-up. This is done by the reeling drums being pulled or pushed out of the cores of the finished paper reels in a feed-back station with the aid of a shearing member in the form of a pull-out means in a shaft-extracting station, and thereafter being inserted into a new empty core in the manner described below. In view of the ungainliness of the paper reel, the shearing member is usually arranged immediately downstream and immediately adjacent the drive side of the reel-handling section of the reel-up, i.e., on the side where the cores are fed in, so they can be returned as the finished reels are taken care of by a transport arrangement provided there, e.g., a sliding carriage or conveyor belt, and removed to the next work station which is generally some type of conversion equipment.

Here the paper cores are also recovered from the paper reels, said cores being placed in an intermediate store consisting of some form of transport container so that they also are re-used, as return cores, in the production of paper reels. From this intermediate store said return cores are then taken manually or using a work vehicle, to a storage arrangement for empty cores where the cores are either emptied from the transport container directly down onto the feed-out ramp, or down into some form of substantially vertical storage container for cores, a core stock, fitted at the upstream side of the feed-out ramp. The storage arrangement for new empty cores is generally located at the end of the production line, in conjunction with said feed-back station and is thus easily accessible to the above-mentioned work vehicle. At the downstream end of the feed-out ramp of the storage arrangement, the empty cores are fed one at a time to a width corresponding to the width of the paper web, to a lifting table arranged between the two stand parts of the reel-up, after which the reeling drum last withdrawn is again introduced into the empty core(s), by the above-mentioned shearing device, and thus forms a reeling drum ready for reeling. The finished reeling drum is then moved to the above-mentioned stock of reels so that the process can start again and thus progress continuously.

In other types of equipment for reeling material webs, primarily for reeling onto short cores with slim dimensions which can be handled in a much simpler manner, it is already known to arrange a special work station where new cores are combined with return cores to form reeling drums. Return cores that have been damaged during the handling process are first repaired in a splicing apparatus belonging to the equipment, where damaged parts of the cores are cut off and the remaining pieces joined together to form new, whole cores.

However, for empty cores intended for the extremely heavy and ungainly paper reels produced in a paper reel-up, such a method does not function well because of the extremely large dimension and weight of the cores. To facilitate handling these cores, which cannot easily be fed manually, a work vehicle or other work tool is required. A major problem is then how this work vehicle can move a large number of return cores without them being damaged.

When filling the magazine or container in the core store, damage such as buckling, torn ends, etc., may be caused to the paper cores, making them unusable. If such a damaged core is not detected the direct consequence may be a relatively expensive stop in production since, in the worst case, the reel-up must be stopped in order to remove the damaged core. To avoid this, each core must be carefully inspected which is a laborious process. The cores may also become clamped in the core stores known hitherto, where the cores lie loose, piled one on top of the other in a complicated jumble, since they fall crookedly and become caught in the container itself or when being transferred to the feed-out ramp through the opening of the container. In all conventional storage arrangements for empty cores where some form of container is used, this must in some way be funnel-shaped to allow the cores to be fed out one by one through the outlet opening of the container, and said container therefore takes up unnecessarily much space in relation to the number of cores stored therein. A rectangular magazine, which could hold many more cores in relation to its height and volume, cannot be used today for the reasons stated above.

Furthermore, with the core containers used hitherto, after moving the transport container filled at the conversion equipment to the storage arrangement for empty cores, the truck driver must manually empty the empty cores from the transport container down onto the feed-out ramp or down into the storage arrangement above said vertical core store. To perform this tedious work, the driver is forced to get down from his truck and then activate the actuator for the container's outlet hatch. Due to the problem described above, of empty cores landing crookedly in the container and thus being clamped, the driver must carefully check the position of the empty cores inside the container after each delivery before activating the actuator for the outlet hatch.

One example of the older technology described above is the conversion equipment shown in Swedish patent specification SE-C-196 384 which, however, is only suitable for a rewinder where the paper reels coming from the reel-up are rewound onto the much slimmer paper cores described in said publication, which are used for rolls of household paper or toilet paper, for instance. The storage arrangement shown in this publication cannot be used for the considerably larger paper cores utilized in drum winders producing paper reels with a diameter and length of several meters, and the cores which cannot be moved in any great quantities manually but must be transported with the aid of a work vehicle.

However, the design shown in this publication clearly illustrates the problems caused by cores lying loose in a funnel-shaped magazine. Such a construction must include a vibrator to prevent pile-ups of the cores and having to use a funnel-shaped container instead of a rectangular one results in a large amount of un-utilized space inside the container.

Another example of old technology is the conversion equipment described in the U.S. patent specification U.S. Pat. No. 4,716,646 where smaller reeling drums are fitted together and placed resting directly on top of each other in a stack in an intermediate store constituting a small container on wheels from which the finished reeling drums are withdrawn in a manner not described, probably manually.

The object of the present invention is to provide an improved and simplified storage arrangement for empty cores for use in a reel-up in a paper machine in which paper is wound onto said empty cores to form paper reels, in which filling and feeding out the empty cores from the storage arrangement is greatly improved.

Another object of the invention is to provide a storage arrangement which is self-emptying.

A third object of the invention is to provide a storage arrangement having a magazine that ensures feed-out of the empty cores without risk of their being damaged, being clamped or jamming during said feed-out in the magazine itself or during transfer to the feed-out ramp.

Another object of the invention is to provide a storage arrangement allowing a better ratio between the volume and height of the container and the maximum number of empty cores stored therein.

Yet another object of the invention is to provide a storage arrangement having an empty core magazine that allows the contents to be inspected and checked from the outside.

Finally, it is also an object of the invention to provide a storage arrangement having a magazine which can easily be transported from the filling station to the storage arrangement for empty cores with the aid of a truck and in a manner facilitating vision of the driver during transport.

SUMMARY OF THE INVENTION

The arrangement according to the invention is characterized in that a plurality of downwardly inclined planes are arranged one beneath the other inside the container and are directed alternately from the front side and the rear side of the container, each plane having a downstream end located a predetermined distance from the adjacent rear side or front side to provide an opening therebetween so that each empty core rolling down an upstream plane continues freely to the next plane in a continuous path of moving empty cores from the inlet opening to the outlet opening, and that said stand also includes a stand table, at which the container is arranged in conjunction with the feed-out ramp in exchangeable manner to enable transport of the container to a filling station.

Thanks to the present invention, therefore, the advantage is gained that the driver of a truck, for instance a slat or fork-lift truck, can see right through the magazine container without obstruction from at least two of its sides and can thus see where he is driving. This is possible due to the empty core magazine being designed in a manner described below so that it is at least partially see-throughable, which also offers the additional advantage of being able to inspect the empty cores.

BRIEF DESCRIPTION OF THE DRAWINGS

The invention is explained in more detail in the following with reference the drawings.

FIG. 4 is an end view of the storage arrangement according to FIG. 1 seen from the upstream end of the storage arrangement.

FIG. 5 is a view of the storage arrangement according to FIG. 1, seen from above.

FIG. 6 is an end view of the storage arrangement according to FIG. 1, seen from the downstream end of the storage arrangement.

FIG. 7 is a view in perspective of an opening device for the magazine basket of the storage arrangement according to FIG. 1, where the opening device is in inoperative position, with its actuator in protruding position.

FIG. 8 shows a detail of the opening device according to FIG. 7, seen from the front.

FIG. 9 shows a detail of the opening device according to FIG. 7, seen from the side.

FIG. 10 is a view in perspective of the opening device according to FIG. 7, but showing said device in its operative position with its actuator pushed in.

FIG. 15 shows a side view of the storage arrangement according to FIG. 1, with an alternative embodiment of the feed-out ramp where said ramp abuts the container on a level with its outlet opening.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
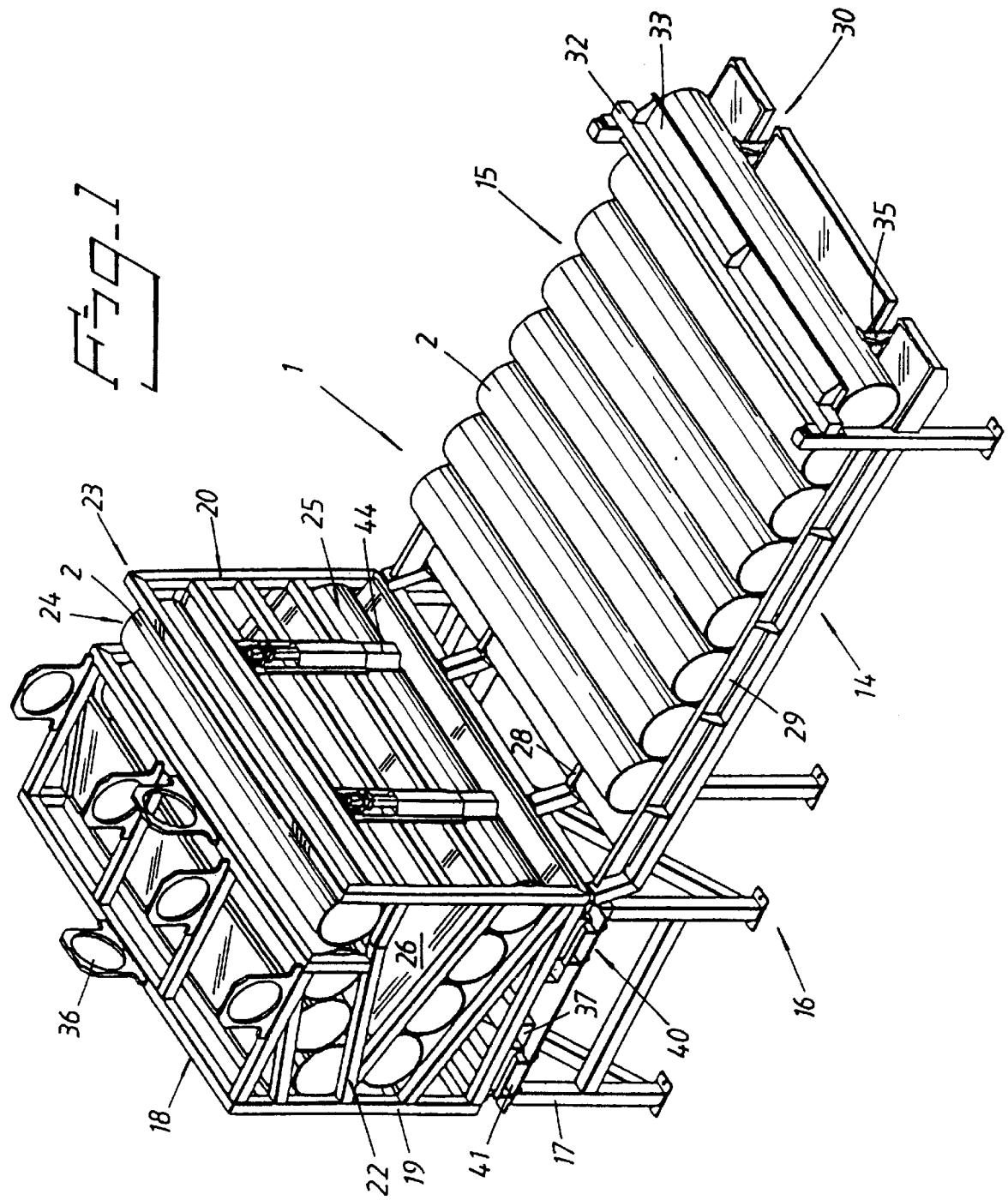
FIG. 1 is a schematic view in perspective of a storage arrangement for empty cores according to the invention, seen from one long side of the storage arrangement, the drive side, comprising an exchangeable magazine basket placed on top of a stand table and having a feed-out ramp with an empty core store downstream of the stand table.
Figure 2:
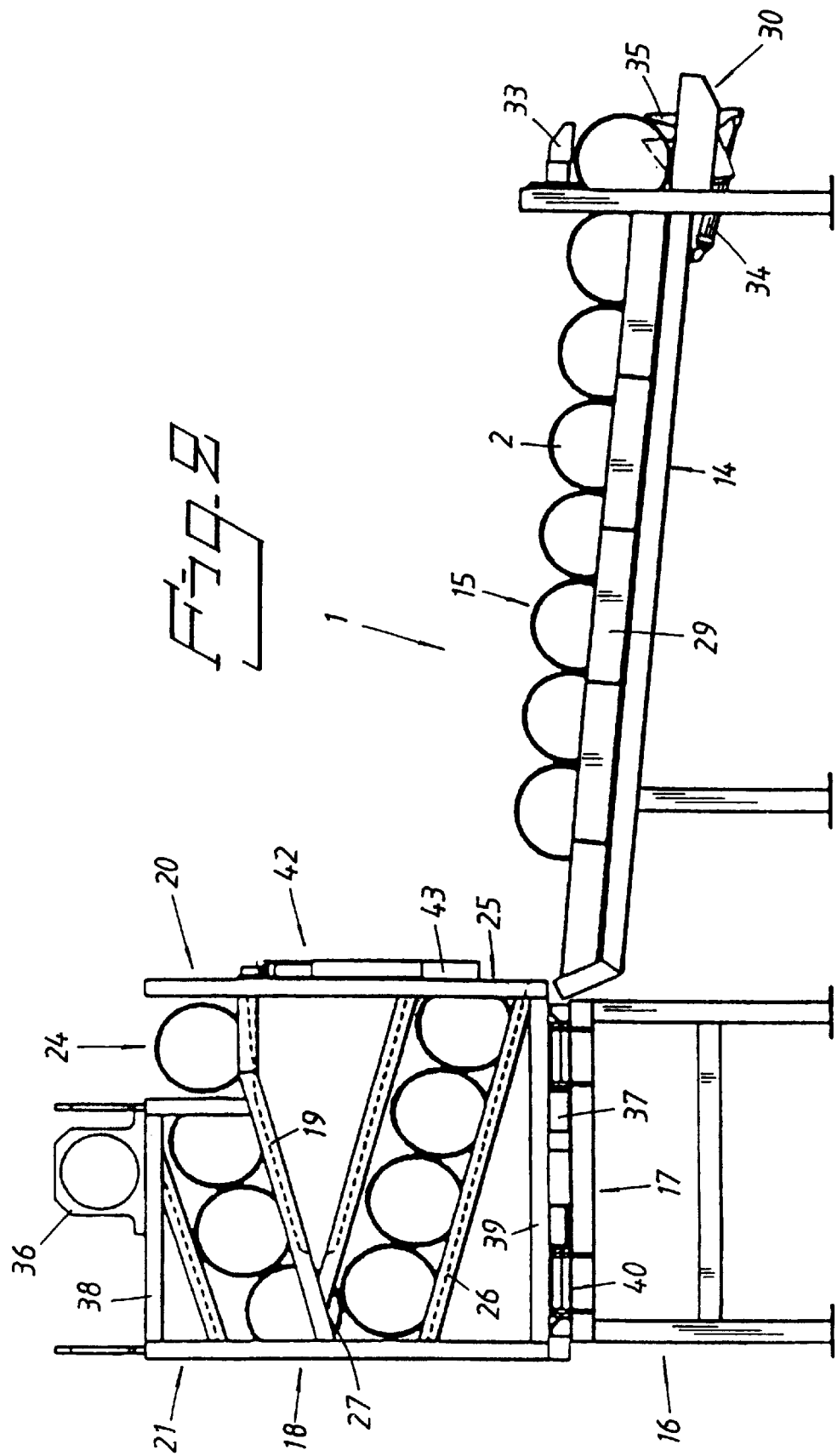
FIG. 2 is a side view of the storage arrangement according to FIG. 1, showing the drive side.
Figure 3:
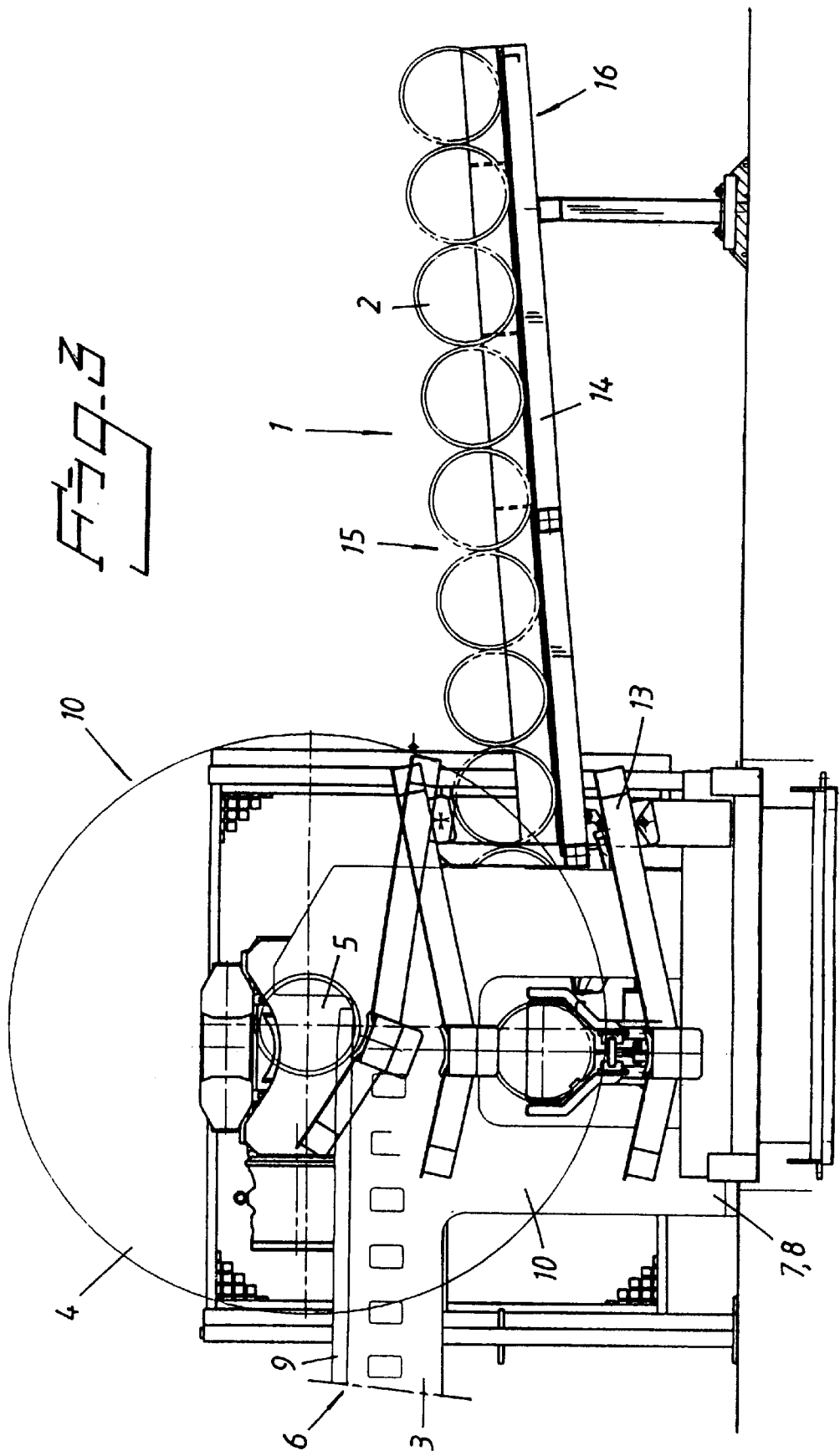
FIG. 3 is a side view of part of a previously known storage arrangement showing the reel-handling part of a reel-up connected to the storage arrangement, seen from its long side and an unreeling station for the finished paper reels by the reel-up.
Figure 10:
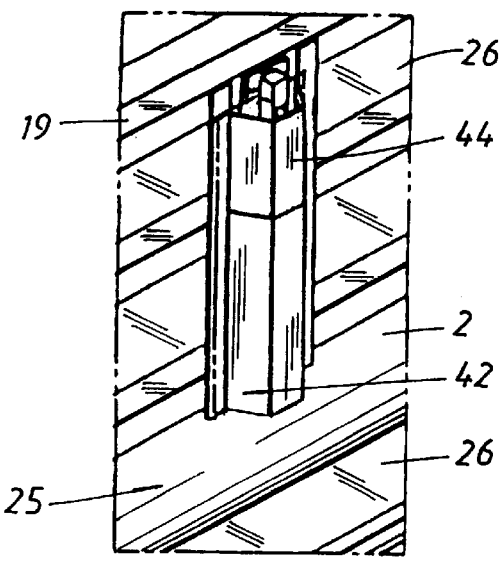
Figure 11:
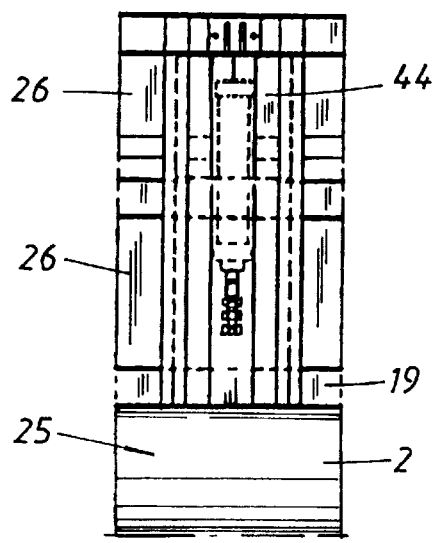
FIG. 11 shows a detail of the opening device according to FIG. 10, seen from the front.
Figure 12:
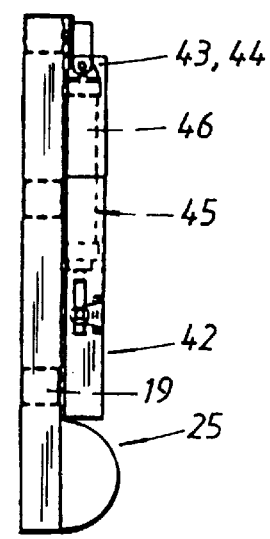
FIG. 12 shows a detail of the opening device according to FIG. 10, seen from the side.

FIGS. 1 and 2 show schematically, in perspective and side view, respectively, a storage arrangement 1 for non-deformable cylindrical empty cores 2 intended for use in a reel-up 3, see FIG. 3, of a paper machine in which paper is manufactured in a continuous paper web. Paper reels 4 are wound continuously in the reel-up 3 on a body comprising a reeling drum 5 and a core applied thereon in the form of the above-mentioned non-deformable cylindrical empty core 2.

The reel-up 3 comprises a stand member 6 having first and second identical, elongate, parallel stand parts 7,8 along which the finished paper reels 4 roll on rails 9 arranged on each stand part 7 and 8, respectively. At the downstream end of the reel-up 3 a reel-handling part 10 takes over the finished paper reels 4 and conveys them further to some form of transport means, not shown, such as a sliding carriage or conveyor, which receives a paper reel 4 and conveys it to a store or conversion equipment, not shown.

A stock of drums, not shown, is arranged upstream of the reel-up in FIG. 3 and above the stand member 6, containing reeling drums 5 with empty cores 2 applied. New reeling drums 5 are lifted down from this stock by means of lowering arms, not shown, to the reel-up 3 where the process of reeling the paper web to a finished paper reel 4 commences. Said stock of drums is filled with new reeling drums 5 by means, not shown, located upstream of said stock.

The finished paper reels 4 are tipped over to the transport device, after which a new empty core 2 is rolled down from a feed-out ramp 14 pertaining to said storage arrangement 1 to a lifting table 13 whereupon, after a sufficient number of cores 2 to achieve the requisite web width of the paper web have been applied on said reeling drum 5, it is again conveyed to said drum stock in a manner not shown. A stock 15 of empty cores is situated on said feed-out ramp 14 between two lengths of guide plates 29 arranged close to each long side of the ramp 14. The feed-out ramp 14 is given sufficient inclination to ensure that the empty cores 2 roll automatically and continuously down one after the other, along the inclined plane of the ramp 14 and the lowermost empty core 2 then rolls over to the lifting table 13 in the manner described below.

In the shown embodiment also one or more strips 28 are arranged on the feed-out ramp 14 (see FIGS. 1 and 5) extending from the upstream end of the ramp 14 to its downstream end, in order to effectively prevent the empty cores 2 from being impeded by any debris that may have accumulated on the ramp 14.

At the downstream end of the feed-out ramp 14 is a separation device 30, rotatable about a shaft, see FIG. 2, which may be in the form of one or more elements 35 rotatable about said shaft by means of actuators 34, said elements 35 comprising one or more protrusions 31 such as spokes (FIG. 6), against or between which each empty core 2 lowermost in the direction of feed of the ramp rests and after or during rotation of the element 35 is imparted a rolling movement downstream. Thanks to this separation device 30, as the lowermost empty core 2 rolls over to the lifting table 13, the next empty core 2 is retained by one or more of said protrusions 31.

In the transverse direction of the ramp 14, above said separation device 30, a barrier 32 is arranged comprising an upper restraining device 33, e.g., a metal sheet, acting as a stop to prevent the lowermost empty core 2 from rolling over the restraining element 35, and also preventing any similar climbing of the following empty cores 2. Thus, said restraining device 33, together with said separation device 30, effectively regulates feed-out of each individual empty core 2 and prevents more than one core 2 from being fed out at a time.

The storage arrangement 1 includes control equipment, not shown or described in detail here, of pneumatic or electric type, including requisite sensors of some conventional type, at the inlet and outlet openings to the storage arrangement 1, e.g., at the inlet and outlet to the feed-out ramp 14.

Figure 14:
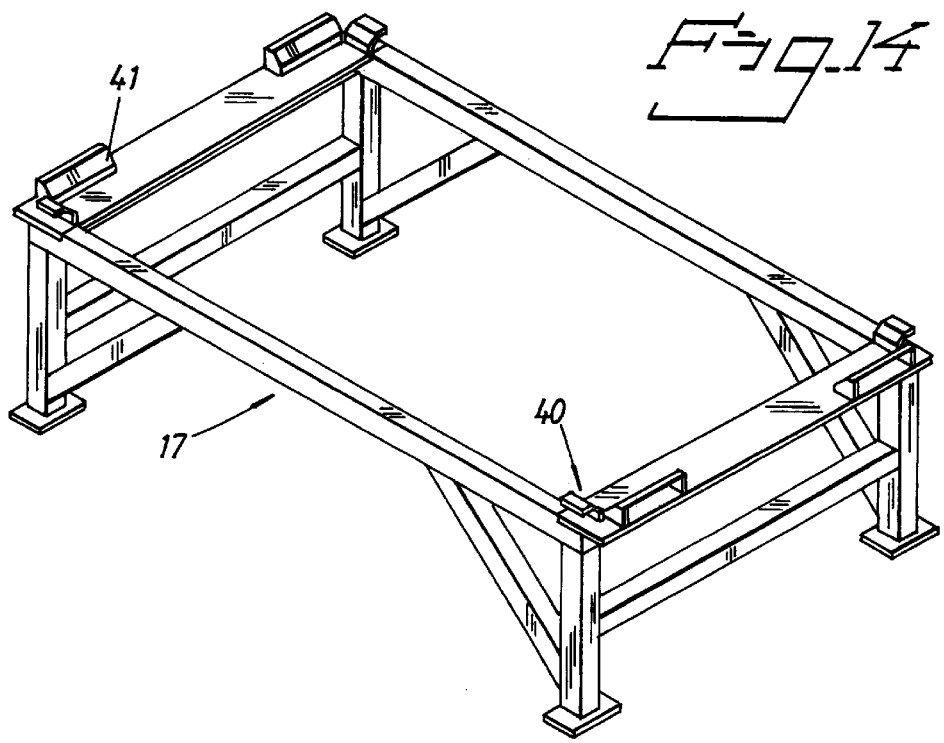
FIG. 14 is a schematic view in perspective of the stand table of the storage arrangement according to FIG. 1 showing guide means for fitting the magazine basket onto the stand table.

The storage arrangement 1 also comprises a stand 16 consisting of three parts, i.e., said feed-out ramp 14, a stand table 17, see FIG. 14, and a container 18 for refilling with new empty cores 2. In the preferred embodiment shown here, this movable and exchangeable container is formed by a rectangular, box-shaped, open magazine basket 18. The term "open" is used here to indicate that the contents can be inspected from the outside of the container 18 which may be composed, as in the shown embodiment, of a frame of horizontal, vertical and diagonal connecting elements, stays or rods 19, preferably of metal, or may consist of a mesh or grid construction, preferably of steel, enabling free vision through said container 18.

The magazine basket 18 comprises two suitably horizontal sides consisting of a top 38 and a bottom 39, and four preferably vertical sides arranged in pairs opposite each other and comprising a front side 20 facing the feed-out ramp 14 and a rear side 21 facing away from said ramp 14, and two parallel sides 22,23 in the feeding direction of the ramp 14, said four sides between them defining an open space for empty cores 2, which container 18 also comprises an upper inlet opening 24 and a lower outlet opening 25 located preferably in the upper 38 and lower side 39, respectively. The lower opening 25 adjoins the upstream end of the feed-out ramp 14. The magazine basket 18 also comprises a plurality of level-forming, downwardly inclined planes or ramps 26 arranged one beneath the other in the open space of the container 18 in a zig-zag pattern seen from the sides 22,23, as described below. These planes are preferably made of flat sheets of thin sheet, metal, metal mesh, rods or grids.

Said planes 26 commence from the front side 20 or the rear side 21 of the magazine basket 18, where they are firmly secured in suitable manner, e.g., by means of a welded joint or some other suitable connection such as screw or rivet joints. The inclined planes 26 extend across the open space of the magazine basket 18 in downward direction, extending alternately towards said front side 20 or rear side 21 of the container 18. The downstream ends of the alternately inclined planes 26 terminate a short distance from each opposing inner side of the container 18. Said short distance forms an opening 27 between the downstream end of the plane 26 and the inner wall of the container 18. The empty cores 2 lying horizontally and parallel to each other in the magazine basket roll down said planes and fall freely down from the downstream end of each plane 26 onto the next inclined plane 26 through said opening 27, which has been given somewhat greater dimension than the diameter of the empty cores 2. The diameter of this type of empty core 2, intended for paper reels, may be as much as 40–50 cm.

Figure 13:
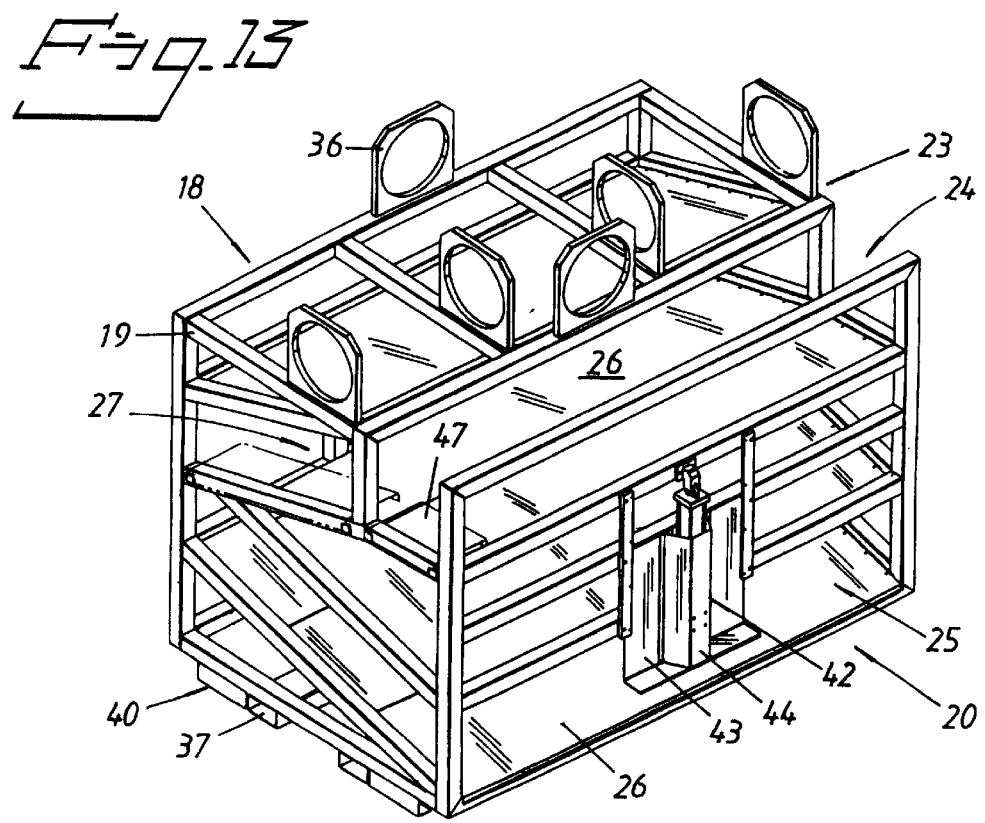
FIG. 13 is a schematic view in perspective of the storage arrangement according to FIG. 1, showing an alternative embodiment of the exchangeable magazine basket including spacers and an alternative, single opening device.

An alternative embodiment of the exchangeable magazine basket 18 is shown in FIG. 13 and includes spacers 47 arranged on each plane 26 along one or both sides 22,23 so that the free distance between said sides 22,23 can be adjusted to predetermined lengths corresponding to the empty cores. Said spacers 47 are preferably made of sheet metal which is bent to suitable form, e.g., U-shaped as in the shown embodiment shown, so that said metal sheets provide a ridge or edge along which the empty cores 2 can roll.

Due to the construction described above, see FIGS. 2 and 13, said empty cores 2 acquire a rolling movement the vertical direction of which is always directed downwards, whereas their horizontal movement alternately changes direction 180° between each plane 26 in the container 18.

At the outlet opening 25 of the container 18 towards the feed-out ramp 14, one or more opening devices 42 are arranged (see FIG. 13 or FIG. 1) which include a closing member 43 such as a gate, flap or hatch, arranged pivotably or slidingly by suitable journalling means or, as in the shown embodiments, or one or two blocking devices 44 which block(s) the outlet opening 25 and also an actuator 45 for said closing member 43, preferably arranged vertically. This actuator 45 may suitably consist of a cylinder 46 (see FIG. 15), in the preferred embodiment a pneumatic cylinder 46, since there is then no risk of hydraulic oil leaking onto the empty cores 2. FIG. 13 shows a vertically displaced closing member 43 comprising only one actuator 45, the member 43 in the embodiment shown being shaped as a curved plate at its lower end and its vertical sides running in vertical guides. If only one actuator 45 is used there is no need for synchronization with other actuators 45.

The opening device(s) 42 for the container 18 is/are designed as described below so that the container 18 is automatically self-emptying when the empty cores 2 are placed correctly on the stand table 17. The arrangement of such automatic opening means 42 limits the number of work phases for the truck driver who no longer needs to get out of the truck to manually empty the container 18. This considerably simplifies the procedure of refilling with new empty cores 2. To achieve said self-emptying, connectors 40 are arranged at the stand 16, comprising a number of guide means 41 and connection means for the closing members 43 of the container 18 so that, with the aid of the slat truck, for instance, the container can easily be mounted on the stand table 17 and, when the container 18 has been fitted onto the stand 17 with the aid of said guide means 41, see FIG. 14, it is connected to the compressed air valve on the connection means, not shown, so that when the magazine basket 18 has assumed its correct position, the cylinders 46 and closing members 43 above said cylinders will be activated, whereupon the empty cores 2 can roll out through the outlet opening 25, down onto the feed-out ramp 14.

The function of the storage arrangement 1 is briefly as follows: The magazine basket 18, filled with new empty cores 2 lying horizontally, parallel and consecutively one after the other alternately in a zig-zag pattern in the direction of feed towards one or other long side of the actual container 18, on the inclined planes 26 located one beneath the other, arrive at the storage arrangement 1 from above-mentioned conversion apparatus, not shown, where the cores 2 have been recovered from the paper reels 4 by means of a crane or work vehicle, e.g., a slat or fork-lift truck, and have been lifted up to a level at the upper surface of the stand 16 with the aid of lifting lugs 36 or fork pouches 37 applied on the top 38 or bottom 39 of the magazine basket 18, and then fitted to the stand table 17 and the connectors 40 suitably arranged thereon so that, when the magazine basket has achieved the correct position it is lowered and possibly automatically locked to the stand table 17 with locking means, not shown, on said stand 16. At the same time compressed air valves are connected, a mechanical device, sensor or other suitable device, not shown, pertaining to said connectors sensing that a correct position has been achieved, whereupon the opening device 42 for the gate 43 of the container 18 is activated. The empty cores 2 can then roll down the inclined planes 26 and one by one out of the container 18 through the outlet opening 25 onto the feed-out ramp 14 of the stand 16.

In other embodiments, not shown, the container 18 described above may also be funnel-shaped or trough-shaped with the front side 20 and/or the rear side 21 inclined vertically inwards or outwards so that a cross-sectional area is formed between them that decreases downwards in the outlet direction of at least a part of the height of the magazine basket 18. In another embodiment of the present invention one, some or all of said above-mentioned front or rear sides 20 or 21, including the inclined planes 26 may be curved along at least a part of its/their extension.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A storage arrangement for storing cores onto which reels of paper are wound in connection with a papermaking machine on the floor of a machine hall, said storage arrangement comprising:

a feed-out ramp for advancing the cores so that the cores can be fed to the papermaking machine, said feed-out ramp being fixed to the machine hall floor and having a fixed upstream end and an opposite downstream end;

a container for the cores removably mounted above the fixed upstream end of the feed-out ramp, said container having a predetermined path of travel therethrough defined at least in part by, an upper inlet opening into which the cores are sequentially placed, a lower outlet opening adjacent to the fixed upstream end of the feed-out ramp for distributing cores to the feed-out ramp, and a plurality of downwardly inclined ramps arranged one beneath the other in an alternating fashion to create a zig-zag path for the cores from the upper inlet opening to the lower outlet opening, and a stand table fixed to the machine hall floor and positioned at the fixed upstream end of the feed-out ramp and being configured to removably support the container such that an empty container on the stand table can be removed from the stand table and exchanged with a new container having a plurality of cores therein, said new container being placed adjacent to the fixed upstream end of the feed-out ramp such that the cores can be distributed to the feed-out ramp.

2. A storage arrangement as claimed in claim 1 further comprising one or more selectively actuable opening devices which, when closed, at least partially close the outlet opening of the container so that cores can be selectively released from the container.

3. A storage arrangement as claimed in claim 2 wherein said opening device further comprises a pneumatic cylinder for selectively opening and closing the outlet opening of the container.

4. A storage arrangement as claimed in claim 2 wherein said opening device is configured to open automatically when a container is placed on the stand table.

5. A storage arrangement as claimed in claim 1 wherein the downwardly inclined ramps are made of at least one of the group consisting of sheet metal, metal mesh, rods and grids.

6. A storage arrangement as claimed in claim 1 wherein the minimum vertical distance between two adjacent ramps is greater than the diameter of the cores and less than about twice the diameter of the empty cores.

7. A storage arrangement as claimed in claim 6 wherein the minimum vertical distance between two adjacent ramps is greater than about 40–50 cm.

* * * * *